(12) United States Patent
Takeuchi

(10) Patent No.: US 9,713,773 B2
(45) Date of Patent: Jul. 25, 2017

(54) GAME SYSTEM, SERVER DEVICE, CONTROL METHOD FOR SERVER DEVICE, PROGRAM, AND INFORMATION RECORDING MEDIUM

(71) Applicant: KONAMI DIGITAL ENTERTAINMENT CO., LTD., Tokyo (JP)

(72) Inventor: Yoji Takeuchi, Yokohama (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 164 days.

(21) Appl. No.: 14/388,247

(22) PCT Filed: Mar. 26, 2013

(86) PCT No.: PCT/JP2013/058753
§ 371 (c)(1),
(2) Date: Sep. 26, 2014

(87) PCT Pub. No.: WO2013/146769
PCT Pub. Date: Oct. 3, 2013

(65) Prior Publication Data
US 2015/0202532 A1    Jul. 23, 2015

(30) Foreign Application Priority Data

Mar. 29, 2012  (JP) .................................. 2012-077221

(51) Int. Cl.
*A63F 9/24* (2006.01)
*A63F 13/79* (2014.01)
(Continued)

(52) U.S. Cl.
CPC ........ *A63F 13/79* (2014.09); *A63F 2300/402* (2013.01); *A63F 2300/8011* (2013.01); *G06F 15/18* (2013.01); *G06Q 10/00* (2013.01)

(58) Field of Classification Search
CPC ............ A63F 2300/5566; A63F 13/828; A63F 13/795; G06F 17/30
See application file for complete search history.

(56) References Cited

U.S. PATENT DOCUMENTS

2008/0026839 A1* 1/2008 Alringer ................... A63F 1/00 463/31
2008/0039165 A1* 2/2008 Harris ..................... G07F 17/32 463/8

(Continued)

FOREIGN PATENT DOCUMENTS

JP    2009-050323 A    3/2009
JP    2010-035968 A    2/2010
JP    2011-253453 A    12/2011

*Primary Examiner* — James S McClellan
*Assistant Examiner* — Syvila Weatherford
(74) *Attorney, Agent, or Firm* — Hubbs, Enatsky & Inoue PLLC

(57) ABSTRACT

A game system executes a first match based on at least one first game object which a first player uses and a plurality of opponent game objects which an opponent uses and are not the opponent itself, executes a second match based on at least one second game object which a second player uses and the plurality of opponent game objects, and identifies at least one opponent game object which is selected by the first player as at least one selected game object. The game system also acquires input information that is input by the first player during or after the first match in regard to the at least one selected game object. The game system records, in an online storage, the input information in association with the at least one selected game object and presents to the second player, the input information.

15 Claims, 9 Drawing Sheets

(51) Int. Cl.
G06F 15/18 (2006.01)
G06Q 10/00 (2012.01)

(56) References Cited

U.S. PATENT DOCUMENTS

| | | | |
|---|---|---|---|
| 2009/0149248 A1* | 6/2009 | Busey | A63F 13/12 |
| | | | 463/29 |
| 2011/0275439 A1 | 11/2011 | Terada et al. | |
| 2013/0143669 A1* | 6/2013 | Muller | A63F 13/12 |
| | | | 463/42 |
| 2013/0151603 A1* | 6/2013 | Lobb | G06Q 50/01 |
| | | | 709/204 |

* cited by examiner

FIG.6

CREATE COMMENT ON GAME CHARACTER A

DRIBBLING

IS GOOD!

ENTER

FIG.7

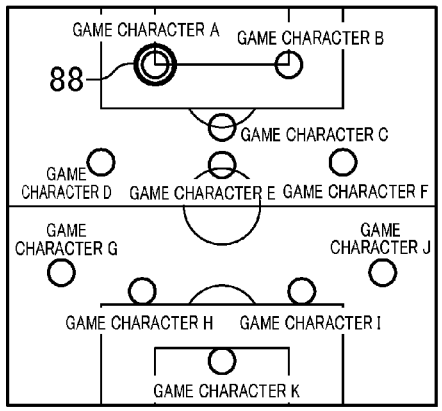

SCOUTING REPORT
○○ LEAGUE, XX-TH GAME

THIRD PLAYER
△△△TEAM    RATING 680    OVERALL RANK: 80,528TH POSITION

GAME CHARACTER A  GAME CHARACTER B
GAME CHARACTER C
GAME CHARACTER D  GAME CHARACTER E  GAME CHARACTER F
GAME CHARACTER G    GAME CHARACTER J
GAME CHARACTER H  GAME CHARACTER I
GAME CHARACTER K

○ GAME CHARACTER L
○ GAME CHARACTER M
○ GAME CHARACTER N
○ GAME CHARACTER O
○ GAME CHARACTER P
○ GAME CHARACTER Q
○ GAME CHARACTER R

FIG.10

| PLAYER INFORMATION | | | TEAM INFORMATION | | GAME CHARACTER INFORMATION | | |
|---|---|---|---|---|---|---|---|
| PLAYER NAME | LEVEL | ATTRIBUTE INFORMATION | TEAM NAME | TACTIC | GAME CHARACTER NAME | POSITION | STATUS |
| AAA | 30 | TOKYO 28 YEARS OLD MALE ... | ZZ TEAM | 3-4-3 OFFENSE- ORIENTED | GAME CHARACTER A GAME CHARACTER B ... | CFW MF ... | PARAMETER A PARAMETER B ... |

FIG.11

| INPUT DATA | | | |
|---|---|---|---|
| WHO | WHOSE | GAME CHARACTER | COMMENT |
| AAA | BBB | GAME CHARACTER Z | TEXT A |
| ⋮ | ⋮ | ⋮ | ⋮ |

FIG.12

| CANDIDATE CHARACTER STRING DATA | |
|---|---|
| FIRST CHARACTER STRING GROUP | SECOND CHARACTER STRING GROUP |
| DRIBBLING | IS GOOD! |
| PASSING | IS DONE EASILY |
| FAKING | IS SLOPPY |
| ⋮ | CAN BE AIMED FOR |
| | ⋮ |

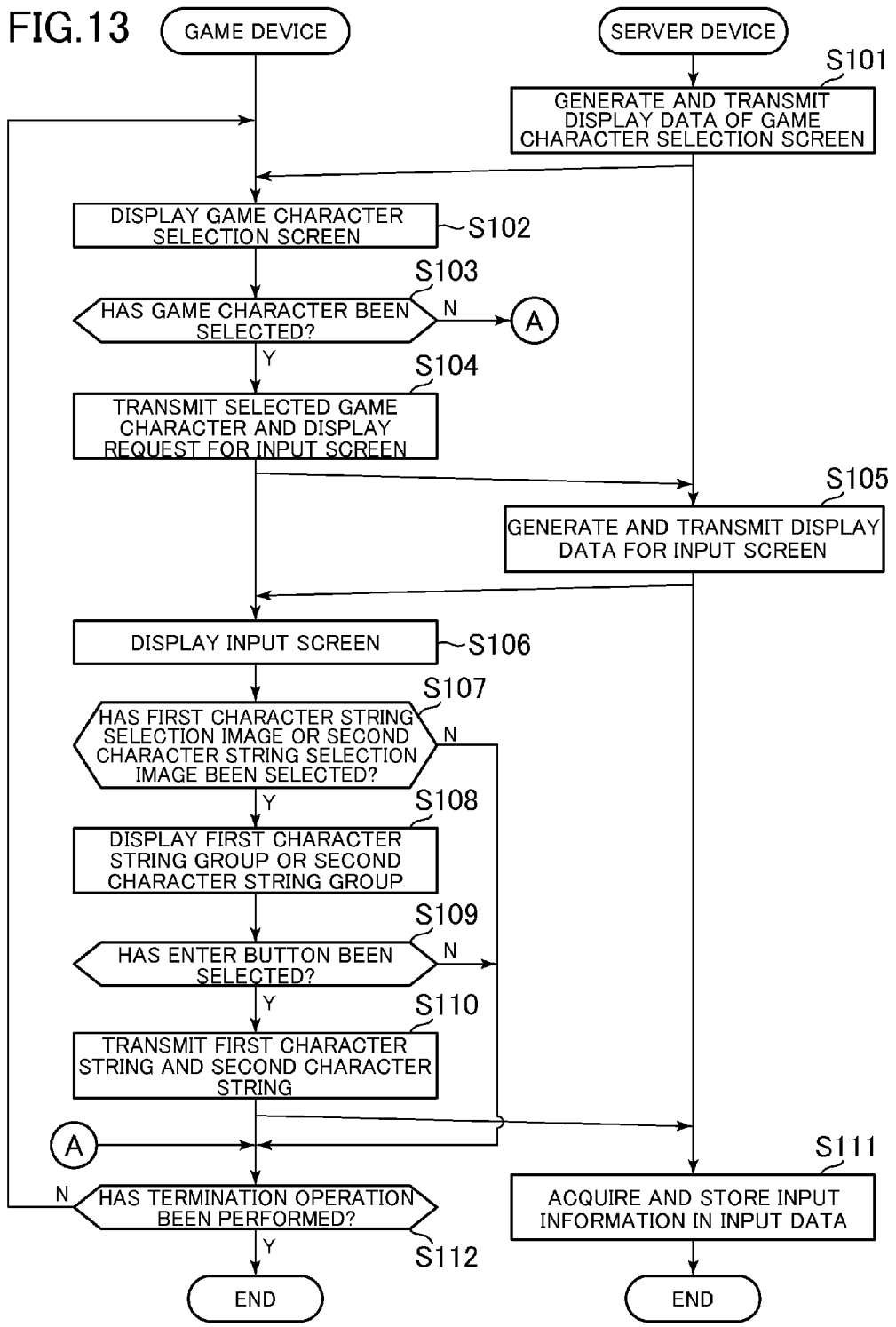

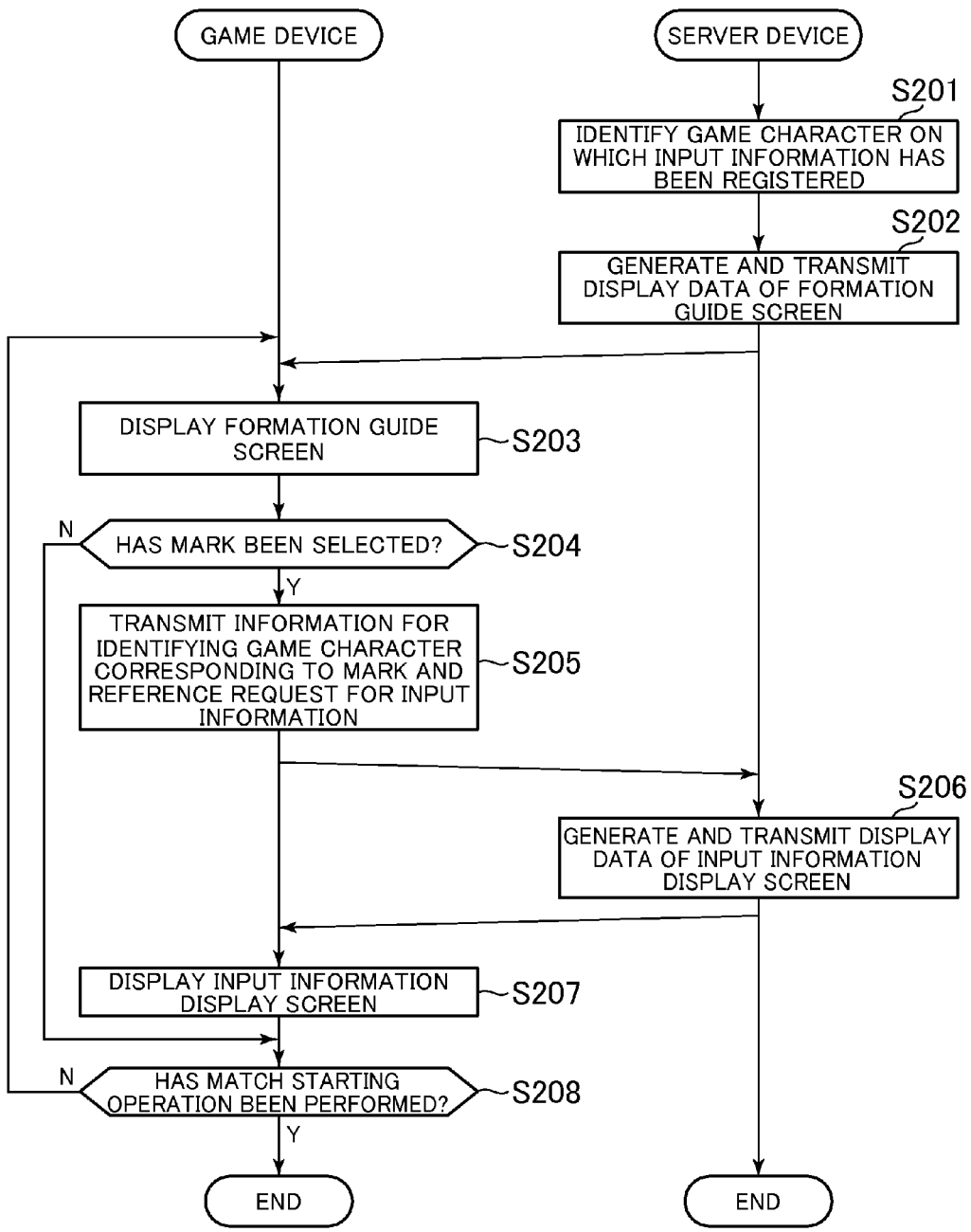

US 9,713,773 B2

GAME SYSTEM, SERVER DEVICE, CONTROL METHOD FOR SERVER DEVICE, PROGRAM, AND INFORMATION RECORDING MEDIUM

CROSS REFERENCE TO RELATED APPLICATIONS

This application is a National Stage of International Application No. PCT/JP2013/058753 filed Mar. 26, 2013, claiming priority based on Japanese Patent Application No. 2012-077221 filed on Mar. 29, 2012. The contents of each of the above documents are incorporated herein by reference in their entirety.

TECHNICAL FIELD

The present invention relates to a game system, a server device, a control method for a server device, a program, and an information recording medium.

BACKGROUND ART

Up to now, there has been known a game system for executing a competitive game. In Patent Literature 1, there is disclosed a game system for executing an online soccer game configured so that two players compete against each other through a network and are allowed to find a formation and starters of an opponent group before a match.

CITATION LIST

Patent Literature

[Patent Literature 1] JP 2009-50323 A

SUMMARY OF INVENTION

Technical Problem

With such a game as disclosed in Patent Literature 1, when a player is capable of correctly grasping parameters of respective soccer players belonging to an opponent group before a match, the player can easily predict haw the match is to play out, and hence it is not possible to surprise the player, which lacks unpredictability in the match.

Therefore, there may be a case of causing the player to feel abilities and the like of the respective soccer players during the match by inhibiting the player from examining the parameters of the respective soccer players belonging to the opponent group on purpose. However, in such a case, merits, demerits, or the like specific to each of the soccer players belonging to the opponent group cannot be found, and hence the player cannot plan a strategy corresponding to the opponent group.

The present invention has been made in view of the above-mentioned problem and an object thereof is to provide a game system, a server device, a control method for a server device, a program, and an information recording medium which are capable of making it easy for a player to plan a strategy corresponding to an opponent group.

Solution to Problem

In order to solve the above-mentioned problem, according to one embodiment of the present invention, there is provided a game system for executing, after a first match is executed based on a game data group or game data of a first player and an opponent dame data group, a second match based on a game data group or game data of a second player and the opponent game data group, the game system including: input information acquisition means for acquiring input information that is input by the first player during execution of the first match or after the execution of the first match in regard to the game data selected as an input target from among the game data belonging to the opponent game data group; input information recording means for recording, in storage means, the input information acquired by the input information acquisition means in association with the game data on the input target; and input information presentation means for presenting the second player with the input information relating to the input target which has been input by the first player in a case where the second match is executed.

According to one embodiment of the present invention, there is provided a server device for executing, after a first match is executed based on a game data group or game data of a first player and an opponent game data group, a second match based on a game data group or game data of a second player and the opponent game data group, the service device including: input information acquisition means for acquiring input information that is input by the first player during execution of the first match or after the execution of the first match in regard to the game data selected as an input target from among the game data belonging to the opponent game data group; input information recording means for recording, in storage means, the input information acquired by the input information acquisition means in association with the game data on the input target; and input information presentation means for presenting the second player with the input information relating to the input target which has been input by the first player in a case where the second match is executed.

According to one embodiment of the present invention, there is provided a control method for a server device for executing, after a first match is executed based on a game data group or game data of a first player and an opponent game data group, a second match based on a game data group or game data of a second player and the opponent game data group, the control method including: an input information acquisition step of acquiring input information that is input by the first player during execution of the first match or after the execution of the first match in regard to the game data selected as an input target from among the game data belonging to the opponent game data group; an input information recording step of recording, in storage means, the input information acquired in the input information acquisition step in association with the game data on the input target; and an input information presentation step of presenting the second player with the input information relating to the input target, which has been input by the first player in a case where the second match is executed.

According to one embodiment of the present invention, there is provided a program configured to cause a computer to function as a server device for executing, after a first match is executed based on a game data group or game data of a first player and an opponent game data group, a second match based on a game data group or game data of a second player and the opponent game data group, the program being further configured to cause the computer to function as input information acquisition for acquiring input information that is input by the first player during execution of the first match or after the execution of the first match in regard to the game data selected as an input target from among the game data belonging to the opponent game data group; input information recording means for recording, in storage means, the input information acquired by the input information acquisition means in association with the game data on the input target; and input information presentation means for presenting the second player with the input information relating to the input target which has been input by the first player in a case where the second match is executed.

In addition, according to one embodiment of the present invention, there is provided a computer-readable information recording medium having the above-mentioned program recorded thereon.

According to one embodiment of the present invention, it is possible to make it easy for the player to plan the strategy corresponding to the opponent group.

In addition, in one aspect of the present invention, the game system further includes: means for acquiring information relating to a strength of the first player from means for storing the information relating to the strength of the first player; means for acquiring information relating to a strength of the second player from means for storing the information relating to the strength of the second player; comparison means for comparing the strength of the first player with the strength of the second player in the case where the second match is executed; and means for restricting a presentation of the input information input by the first player to the second player based on a comparison result from the comparison means.

In addition, in one aspect of the present invention, the game system further includes: means for acquiring a first game parameter relating to the game data group or the game data of the first player from means for storing the first game parameter; means for acquiring a second game parameter relating to the game data group or the game, data of the second player from means for storing the second game parameter; comparison means for comparing the first game parameter with the second game parameter in the case where the second match is executed; and means for restricting a presentation of the input information input by the first player to the second player based on a comparison result from the comparison means.

In addition, in one aspect of the present invention, the game system further includes: means for setting the game data group or the game data selected by the first player from among a plurality of kinds of game, data group or game data provided to the game as the game data group or the game data of the first player; means, for setting the game data group or the game data selected by the second player from among the plurality of kinds of game data group or game data as the game data group or the game data of the second player; comparison means for comparing a kind of the game, data group or a kind of the game data of the first player with a kind of the game data group or a kind of the game data of the second player in the case where the second match is executed; and means, for restricting a presentation of the input information input by the first player to the second player based on a comparison result from the comparison means.

In addition, in one aspect of the present invention, the game system further includes: means for acquiring attribute information on the first player from means for storing the attribute information on the first player; means for acquiring attribute information on the second player from means for storing the attribute information on the second player; comparison means for comparing the attribute information on the first player with the attribute information on the second player in the case where the second match is executed; and means for restricting a presentation of the input information input by the first player to the second player based on a comparison result from the comparison means.

In addition, in one aspect of the present invention, the game system further includes: means for setting a tactic selected from among a plurality of kinds of tactics provided to the game as the tactic of the game data group or the game data of the first player; means for setting a tactic selected from among the plurality of kinds of tactics as the game data group or the game data of the second player; comparison means for comparing the tactic of the first player with the tactic of the second player in the case where the second match is executed; and means for restricting a presentation of the input information input by the first player to the second player based on a comparison result from the comparison means.

In addition, in one aspect of the present invention, the game system further includes: means for setting a tactic selected from among a plurality of kinds of tactics provided to the game as the tactic of the opponent game data group; comparison means for comparing the tactic set for the opponent game data group at a time of the first match with the tactic currently set for the opponent game data group in the case where the second match is executed; and means for restricting a presentation on the input information input by the first player to the second player based on a comparison result from the comparison means.

In addition, in one aspect of the present invention, the game system further includes: means for setting a role selected from among a plurality of kinds of roles provided to the game for each game data belonging to the opponent game data group; comparison means for comparing the role set for the game data on the input target at a time of the first match with the role currently set for the game data in the case where the second match is executed; and means for restricting a presentation of the input information input by the first player to the second player based on a comparison result from the comparison means.

In addition, in one aspect of the present invention, the game system further includes: means for acquiring a game parameter relating to the opponent game data group or each game data belonging to the opponent game data group from means for storing the game parameter; comparison means for comparing the game parameter at a time of the first match with the current game parameter in the case where the second match is executed; and means for restricting a presentation of the input information input by the first player to the second player based on a comparison result from the comparison means.

In addition, in one aspect of the present invention, the game system further includes means for receiving the first player's selection of opponent game data as the input target from among opponent game data belonging to the opponent game data group after the first match is executed.

In addition, in one aspect, of the present invention, the input information includes at least a first character string, and a second character string, the game system further includes: means for acquiring information relating to a first character string group for providing candidates for the first character string and a second character string group for providing candidates for the second character string from means for storing the information; and means for presenting the first player with the first character string group and the second character string group, and the input information acquisition means includes: means for acquiring a character string selected by the first player from within the first character string group as the first character string; means for acquiring a character string selected by the first player from within the second character string group as the second character string; and means for acquiring the input information based on the first character string and the second character string that have been acquired.

In addition, in one aspect of the present invention, the game system further executes, after the first match is executed based on a game character data group or game character data of the first player and an opponent game character data group, the second match based on a game character data group or game character data of the second player and the opponent game character data group, and the input information acquisition means acquires the input information input by the first player during execution of the first match or after the execution of the first match in regard to the game character data selected as the input target from among the game character data belonging to the opponent game character data group.

In addition, in one aspect of the present invention, the game, system further executes, after the first match is executed based on a game card data group or game card data of the first player and an opponent game card data group, the second match based on a game card data group or game card data of the second player and the opponent game card data group, and the input information acquisition means acquires the input information input by the first player during execution of the first match or after the execution of the first match in regard to the game card data selected as the input target from among the game card data belonging to the opponent game card data group.

BRIEF DESCRIPTION OF DRAWINGS

FIG. 6 showing an example of an input screen.

FIG. 7 is a figure showing an example of a formation guide screen.

FIG. 10 is a table showing a data storage example of player data.

FIG. 11 is a table showing a data storage example of input data.

FIG. 12 is a table showing a data storage example of candidate character string data.

FIG. 13 is a figure showing an example of input information accumulation processing.

FIG. 14 is a figure showing an example of input information presentation processing.

DESCRIPTION OF EMBODIMENTS

1. Embodiment

Now, a detailed description is made of an example of an embodiment of the present invention with reference to the accompanying drawings.

Figure 1:
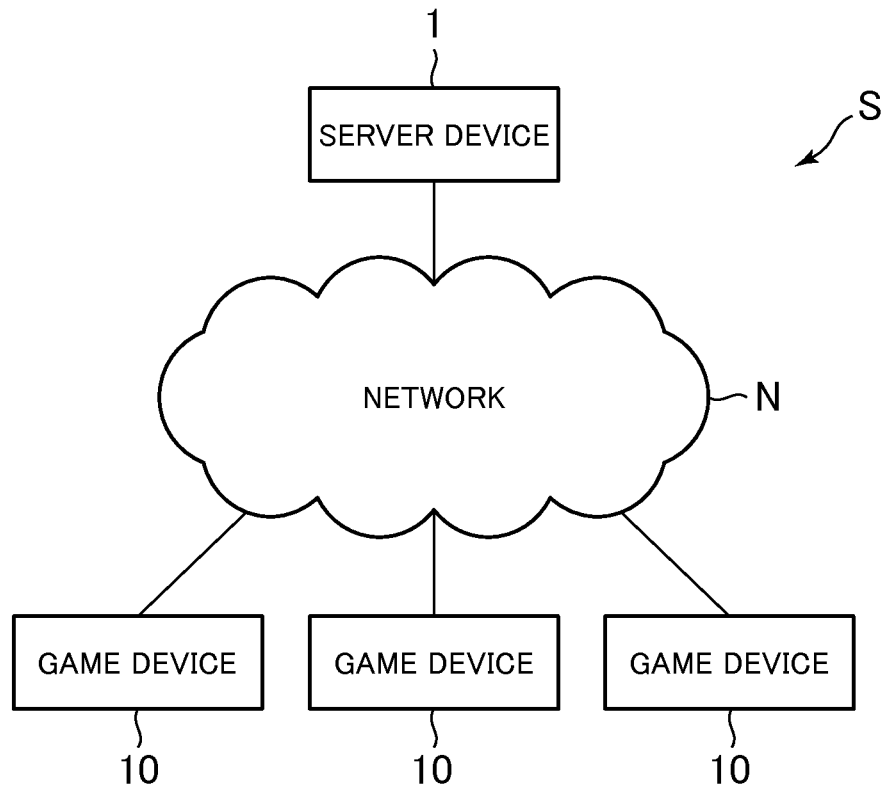
FIG. 1 is a figure showing an overall configuration of a game system according to the present invention.

FIG. 1 is a figure showing an overall configuration of a game system according to the present invention. As showed in FIG. 1, a game system S according to this embodiment includes a server device 1 for controlling a game in a centralized manner and game devices 10 that are operated by each player. A plurality of game devices 10 are connected to the server device 1 or the other game devices 10 through a network N so as to be able to transmit/receive data to/from the server device 1 or the other game devices 10.

Note that, the description is made here by taking an example in which the game system S includes three game devices 10 corresponding to three players (hereinafter referred to as "first player to third player"; those three may also be collectively referred to simply as "player"), but devices included in the game system S are not limited thereto.

Figure 2:
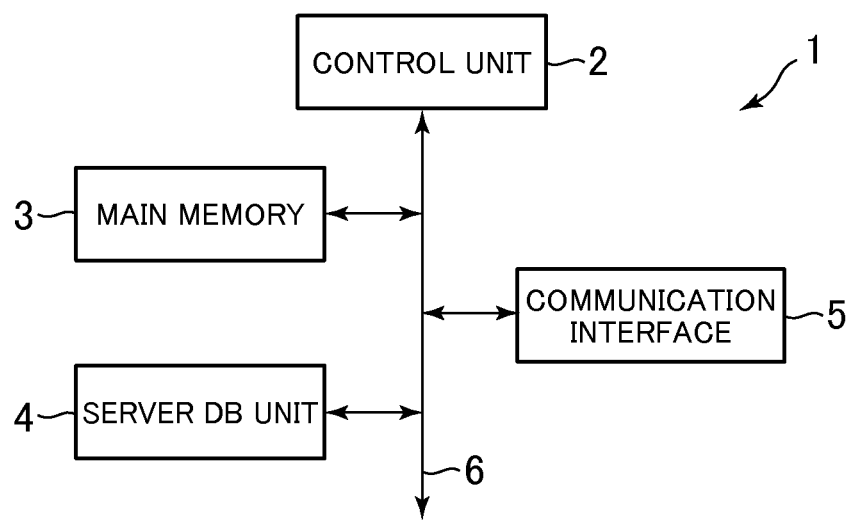
FIG. 2 is a figure showing a hardware configuration of a server device.

FIG. 2 is a figure showing a hardware configuration of the server device 1. As showed in FIG. 2, the server device 1 is a server computer including a control unit 2, a main memory 3, a server DB unit 4 (information recording medium), and a communication interface 5, in which the respective components are connected to the other components through a bus 6.

The control unit 2 includes one or a plurality of control units (for example, CPUs). The control unit 2 executes an operating system and various programs stored in a storage unit (not shown) to control the respective components of the server device 1 in a centralized manner. The main memory 3 includes a RAM, and temporarily stores the above-mentioned operating system, the above-mentioned various programs, and various kinds of data.

The server DB unit 4 (information recording medium) includes a large-capacity hard disk drive, and stores various kinds of data described later. The communication interface 5 is an interface for connecting the server device 1 to a communication network such as the Internet in a wired or wireless manner.

Figure 3:
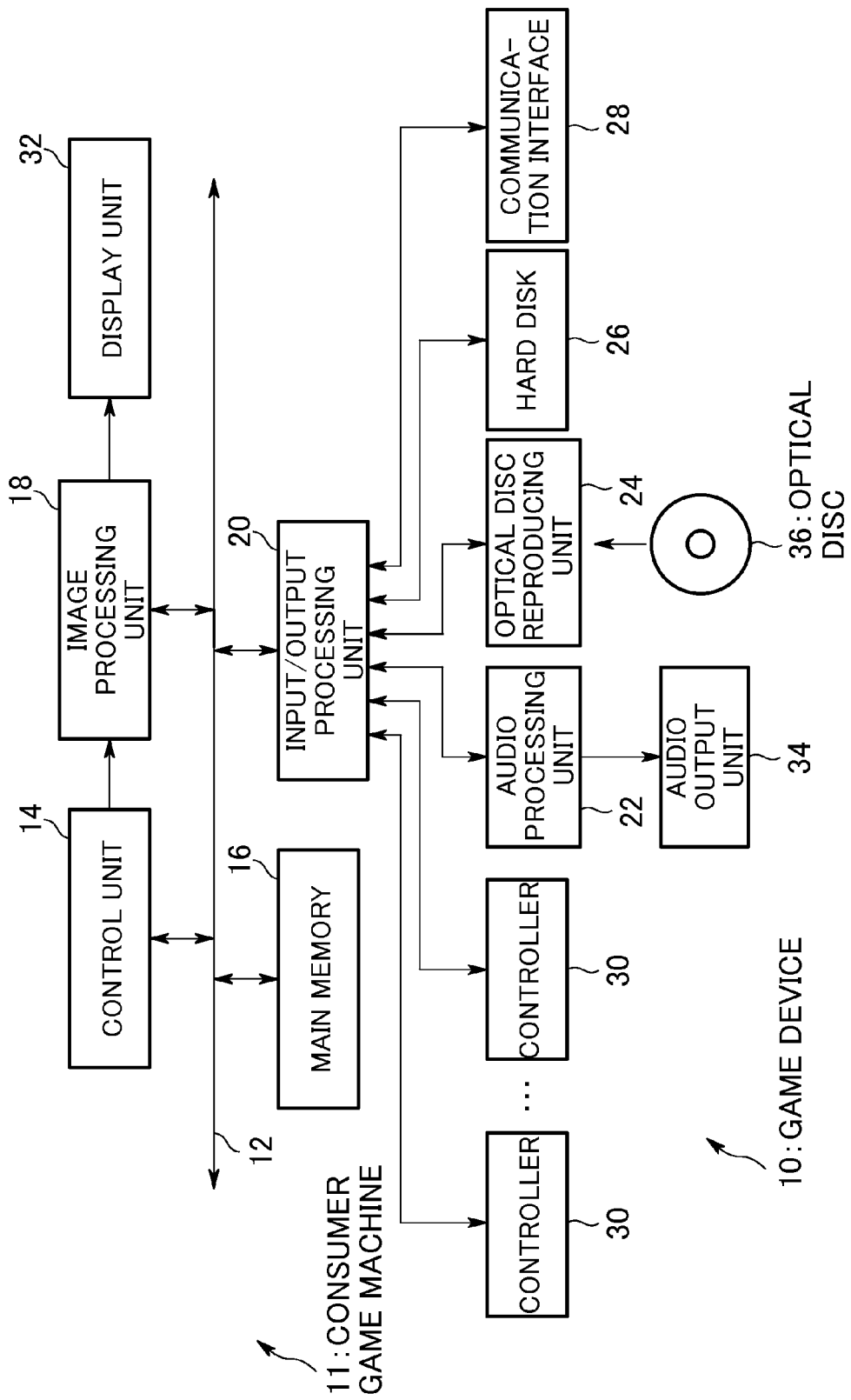
FIG. 3 is a figure, showing a hardware configuration of a game device.

FIG. 3 is a figure showing a hardware configuration of the game device 10. As showed in FIG. 3, the game device 10 includes as consumer game machine 11, a display unit 32, an audio output unit 34, and an optical disc 36 (information recording medium). Note that, the description is made here by taking an example, in which the game device. 10 is implemented by a consumer game machine, but the dame device 10 may be implemented by a portable game machine, a cellular phone (smartphone), a personal computer, or the like.

The display unit 32 and the audio output unit 34 are connected to the consumer game machine 11. The display unit 32 is, for example, a home-use television set or liquid crystal display. The audio output unit 34 is, for example, a speaker built into the home-use television set, or headphones.

The consumer game machine 11 is a known computer game system. The consumer game machine 11 includes a bus 12, a control unit 14, a main memory 16, an image processing unit 18, an input/output processing unit 20, an audio processing unit 22, an optical disc reproducing unit 24, a hard disk 26, a communication interface 28, and a controller 30.

The control unit 14 includes one or a plurality of control units (for example, CPUs). The control unit 14 executes processing of controlling the respective units of the consumer game machine 11 and information processing based on an operating system stored in a ROM (not shown) and programs read from the optical disc 36.

The main memory 16 includes, for example, a RAM. The programs and data read from the optical disc 36 are written into the main memory 16. The main memory 16 is also used as a working memory for the control unit 14. The bus 12 is used for communicating addresses and data among the respective units of the consumer game machine 11.

The image processing unit 18 includes a VRAM. The image processing unit 18 renders a game screen on the VRAM based on image data supplied from the control unit 14. The game screen rendered on the VRAM is converted into video signals, and the video signals are then output to the display unit 32 at a predetermined timing.

The input/output processing unit 20 is an interface for the control unit 14 to access the audio processing unit 22, the optical disc reproducing unit 24, the hard disk 26, the communication interface 28, and the controller 30.

The audio processing unit 22 includes a buffer. The audio processing unit 22 outputs, from the audio output unit 34, audio data loaded from the optical disc 36 into the sound buffer.

The communication interface 28 is an interface for connecting the consumer game machine 11 to a communication network such as the Internet in a wired or wireless manner.

The optical disc reproducing unit 24 reads the programs and data recorded in the optical disc 36. In this embodiment, a description is made of a case where the optical disc 36 is used to supply the programs and data to the consumer game machine 11, but another information recording medium, such as a memory card, may be used to supply the programs and data to the consumer game machine 11. Alternatively, for example, the programs and data may be supplied to the consumer game machine 11 from a remote site via the communication network.

The hard disk 26 is a commonly-used hard disk drive (auxiliary storage). Note that, the programs and data that are described as being stored in the optical disc 36 in this embodiment may be stored in the hard disk 26 instead.

The controller 30 is an operation unit for a player to perform a game operation. One or a plurality of the controllers 30 are connected to the consumer game machine 11 in a wired or wireless manner. The input/output processing unit 20 scans the state of each operation member of the controller 30 every predetermined cycle (for example, every 1/60 second). An operation signal representing the scanning result is supplied to the control unit 14 via the bus 12. The control unit 14 determines the game operation of the player based on the operation signal.

2. Game Executed in the Game System

Next, a description is made of a game executed in the game system S. In the game system S according to this embodiment, after a match between a first team of the first player and a third team of the third player is executed, a match between a second team of the second player and the third team it executed. The following description is made of a case of executing a game for a competition (for example, soccer) configured so that two teams compete against each other. When a soccer game is started, a game screen that imitates a soccer stadium is displayed on the display unit 32.

Figure 4:
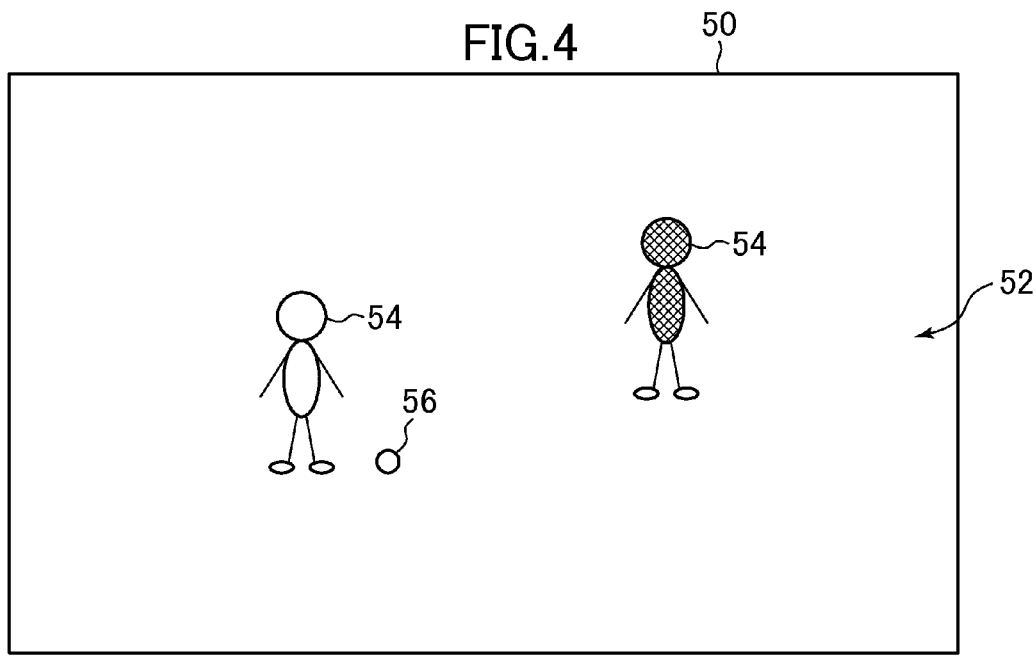
FIG. 4 is a figure showing an example of a game screen.

FIG. 4 is a figure showing an example of the game screen. As showed in FIG. 4, a field 52 representing a soccer field, game characters 54 belonging to each team, and a ball 56 are displayed on a game screen 50. Although the illustration is omitted from FIG. 4, eleven game characters 54 belong to one team, and an eleven-to-eleven match is played.

In this embodiment, each of the game characters 54 autonomously operates by a computer's operation in principle. When starting a match, the player designates a formation of his/her own team, starters, backup members, and a game plan of the team. The game characters 54 act based on those designations made by the player and a behavior algorithm defined in a game program.

Note that, an instruction for causing the game character 54 to perform a shot, an action instruction for the game character 54 playing a role of goalkeeper, and an action instruction issued personally to the game character 54 during the match may be input appropriately by the player during the match. Further, items that can be designated by each player before the match are not limited to the above-mentioned examples. In addition, the player may be allowed to designate a method of marking an opponent.

In the game system S, when the match is finished, input information relating to each game character 54 belonging to the team of the opponent can be input by each player. This embodiment is described by taking an example in which a comment (for example, character string) input by the player corresponds to the input information, but the input information is not limited thereto. The input information may be any medium that transmits information to another player, and at least one of, for example, a character, a symbol, an image (for example, picture), and voice that is input by the player may correspond to the input information. The input information that has been input can be viewed by another player that is to compete against the opponent in the future. In other words, when the match is finished, each player can leave a piece of advice about a strong point and a weak point of the opponent for another player to fight thereagainst.

In this embodiment, a description is made of a case where the first player leaves the input information about each game character 54 of the third team for the second player after the match between the first team and the third team is executed. When the match between the first player and the third player is finished, the game device 10 operated by the first player displays thereon a character selection screen that allows the first player to select whose input information is to be left among the respective game characters 54 belonging to the third team.

Figure 5:
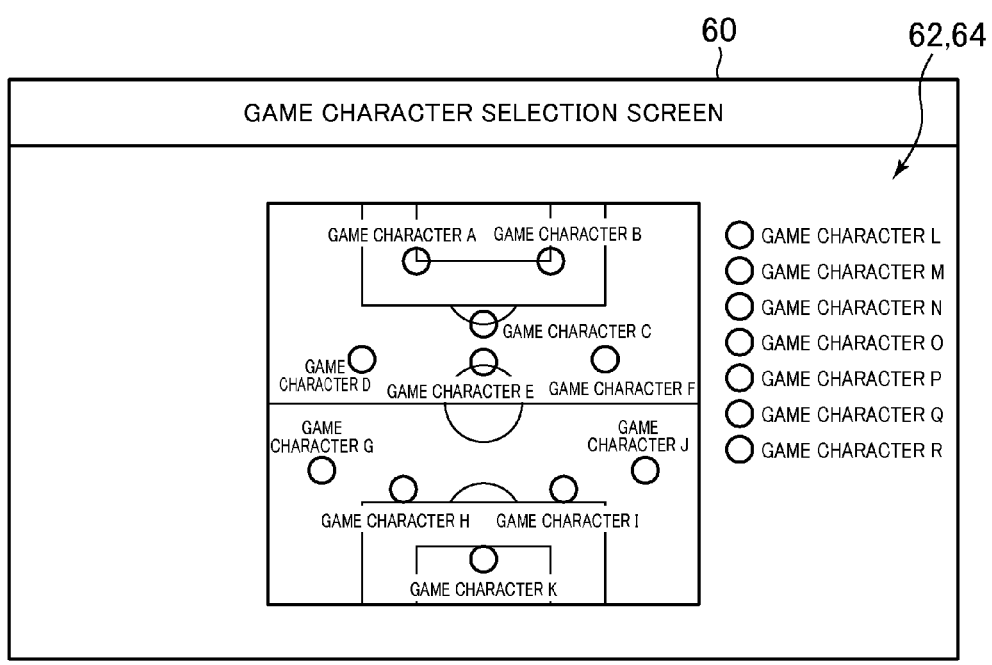
FIG. 5 is a figure showing an example of a character selection screen.

FIG. 5 is a figure showing an example of the character selection screen. As showed in FIG. 5, on a character selection screen 60, a formation image 62 representing the formation of the third team is displayed, and character names 64 are displayed so as to be superimposed on the formation image 62. The first player selects the game character name 64 to designate the game character 54 on which the input information is to be left. When the first player designates the game character 54 on which the input information is to be left, an input screen for inputting the input information relating to the game character 54 is displayed.

FIG. 6 is a figure showing an example of the input screen. As showed in FIG. 6, on an input screen 70, as game character name. 72 of the game character 54 designated by the first player is displayed. Here, the first player can select two character strings as the input information on the game character 54. The character strings that can be selected by the first player are provided to the server device 1 in advance.

When the first player selects an enter button 78 after selecting a first character string "dribbling" from a first character string selection image 74 and selecting a second character string "is good" from a second character string selection image 76 the phrase "dribbling is good" obtained by coupling the first character string and the second character string that have been selected by the first player is recorded on the server device 1 as the input information (in other words, advice for the second player) on the game character 54.

Note that, the number of game characters 54 on which the first player can leave the input information is not limited to one. The input information on any number of game characters 54 that belong to the third team can be left. For example, after leaving the input information relating to a given game character 54 of the third team through the input screen 70, the first player can leave the input information relating to another game character 54 by selecting another game character name 64 on the character selection screen 60.

The input information left by the first player is displayed on the game device 10 operated by the second player in a case where the match between the second team and the third team is executed. Here, a formation guide screen for guiding the second player to the formation of the third team and the like is displayed on the game device 10 operated by the second player before the match between the second team and the third team is executed. When performing a predetermined operation on the formation guide screen, the second player can view the input information left by the first player.

FIG. 7 is a figure showing an example of the formation guide screen. As showed in FIG. 7, displayed on a formation guide screen 80 are match information 82 indicating various kinds of information relating to the match, player information 84 indicating information relating to the third player, and a formation image 86 indicating the formation, the starters, and the backup members of the third team. The character names arranged in the formation image 86 indicate the starters and the backup members.

Here, a predetermined mark 88 is displayed around the character name on which the first player has left the input information among the starters of the team operated by the third player. When the second player selects the mark 88, the input information on the game character 54 left by the first player is displayed.

Figure 8:
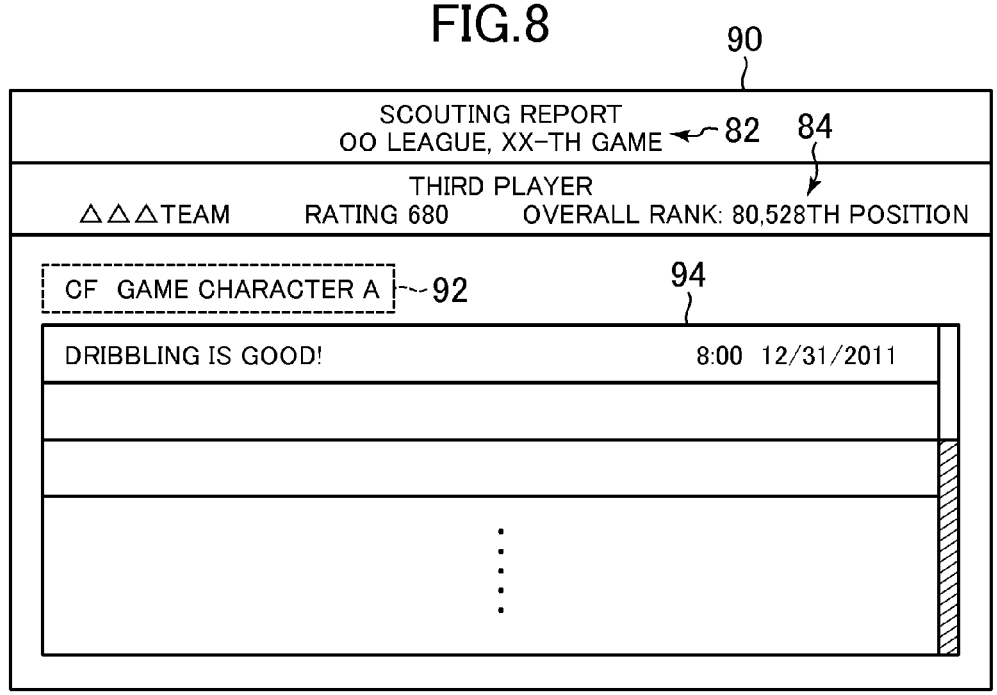
FIG. 8 is a figure showing an example of an input information display screen for presenting input information left by a first player to a second player.

FIG. 8 is a figure showing an example of an input information display screen for presenting the input information left by the first player to the second player. Displayed on an input information display screen 90 are not only the match information 82 and the player information 84 but also character information 92 indicating the name and position of the game character 54 and an input information list 94 indicating contents of the input information on the game character 54 left by the first player. As showed in FIG. 8, the input information left by the first player is displayed in the input information list 94, to thereby present the input information to the second player.

In such a manner, the second player only needs to view the input information left in the input information list 94 to be able to grasp merits and demerits of each game character 54 of the third team, which are unclear only with the formation or the starters, and can therefore be prepared for the match with a counterplan against the third team. This technology is described below in detail.

3. Functions Implemented by the Game System

Figure 9:
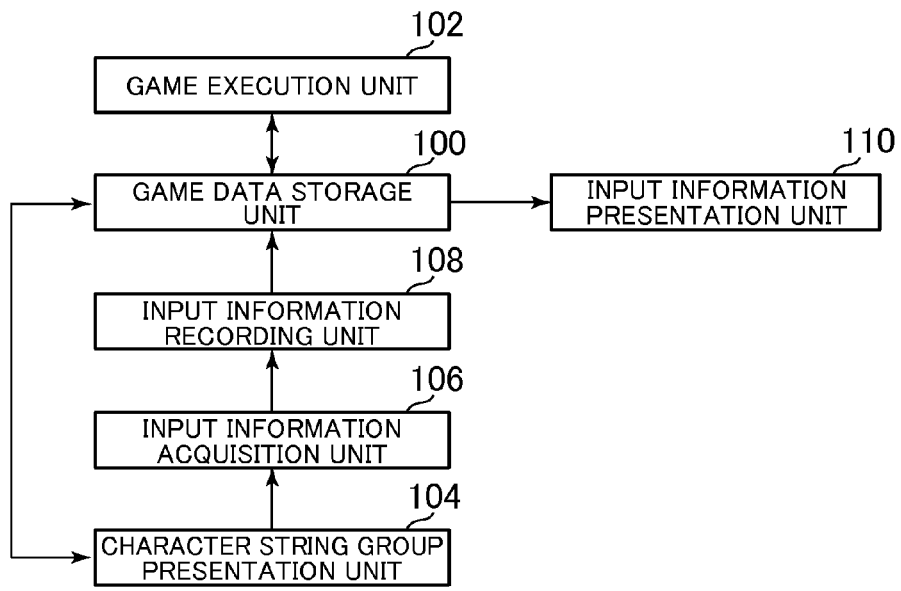
FIG. 9 is a functional block diagram showing functions relating to the present invention among functions implemented by the game system.

FIG. 9 is a functional block diagram showing functions relating to the present invention among functions implemented by the game system S. The game system S has the game program executed, to thereby implement a game data storage unit 100, a game execution unit 102, a character string group presentation unit 104, an input information acquisition unit 106, an input information recording unit 108, and an input information presentation unit 110. Here, a description is made of a case where the respective functions described above are implemented by the server device 1.

3-1. Game Data Storage Unit

The game data storage unit 100 is implemented mainly by, for example, the server DB unit 4. The game data storage unit 100 stores various kinds of data necessary to implement the game. Here, the game data storage unit 100 stores (1) game situation data indicating the situation of the game in which the match is being played, (2) player data storing various kinds of information relating to each player, (3) input data relating to the input information left by each player, and (4) candidate character string data indicating the character string used by each player to create the input information.

[Game Situation Data]

The game situation data includes, for example, information indicating a current situation (positions and moving directions of the game character 54 and the ball 56) of a virtual space and information indicating a score of each team. The game situation data is generated when the match for each player is started and updated in accordance with the player's operation or progress of the game.

[Player Data]

FIG. 10 is a table showing a data storage example of the player data. As shown in FIG. 10, the player data stores player information relating to each player, team information relating to the team used by each player, and character information relating to the game character 54 belonging to the team of each player, in association with one another. When the player performs an operation for registering for use of the game system S, a new record is generated in the player data, and contents of the record are updated in accordance with gameplay of the player.

The player information includes, for example, a player name for uniquely identifying the player, information (for example, numerical value or symbol representing a level or experience point) relating to a strength of the player, and attribute information indicating an attribute of the player. The information relating to the strength of the player is updated in accordance with the gameplay (for example, match result) of the player. The attribute information is personal information (registration information) on the player, and stores, for example, information (for example, residence, age, sex, relationship, and occupation) relating to the player himself/herself or information (for example, favorite soccer team) relating to taste of the player.

The team information includes information relating to the team name used by the player and information relating to a tactic used by the player. As the team name used by the player, for example, a character string input by the player when registering for the game is stored, or the team name selected by each player from among a plurality of kinds of team name (for example, actual soccer team) provided for the game is stored. The information relating to the tactic used by the player stores information indicating the formation and the game plan of the team used by the player, and stores, for example, the information selected by the player from among a plurality of kinds of formation and game plan that are provided.

The character information includes the name of the game character 54 belonging to the team used by the player, information (for example, position) relating to a role of the game character 54, and information indicating a status (for example, ability value or condition) of the game character 54. The role of the character may be associated with each game character 54 by a game creator in advance, or may be designated by the player. The information indicating the status of the game character 54 is a game parameter relating to the game character 54, and is appropriately updated in accordance with the progress of the game.

[Input Data]

FIG. 11 is a table showing a data storage example of the input data. As shown in FIG. 11, the input data stores information for identifying each player, information (for example, team name and character name) indicating the game character 54 on which the input information has been left, and information for identifying contents of the input information on the game character 54 that has been left, in association with one another. The information for identifying the player stores information indicating the player who has left the input information and information indicating the player who has the input information left, and indicates "who" has left the input information on "which" team.

The information for identifying the contents of the input information stores input information ID for uniquely identifying the input information on each game character 54 that has been left, data (text data or data indicating a combination of the first character string and the second character string) indicating the contents of the input information, and information indicating a time at which the input information is input. In this embodiment, a combination of two character strings indicated by the candidate character string data described later is used as the text data. Note that, a symbol is stored in the input data when the input information is the symbol, image data is stored in the input data when the input information is an image, and audio data is stored in the input data when the input information is voice.

[Candidate Character String Data]

FIG. 12 is a table showing a data storage example of the candidate character string data. As shown in FIG. 12, the candidate character string data stores information (text data), relating to a first character string group for providing candidates for the first character string and a second character string group for providing candidates for the second character string. Here, the first character string group includes a plurality of character strings containing a subject of a sentence, and the second character string group includes a plurality of character strings containing a predicate of a sentence.

Note that, the control unit 2 and the control unit 14 each function as means for acquiring storage contents of the game data storage unit 100. Further, the data structures of the game situation data, the player data, the input data, and the candidate character string data are not limited to the above-mentioned examples. Further, the data stored in the game data storage unit 100 is not limited to the above-mentioned examples. In addition, for example, the game data storage unit 100 may store data indicating the match result of each player or other such data.

3-2. Game Execution Unit

The game execution unit 102 is implemented mainly by the control unit 2. The game execution unit 102 executes a game configured so that a first match is executed based on the game data group (for example, first team) or game data (for example, game character) of the first player and an opponent game data group (for example, third team) and then a second match is executed based on a game data group (for example, second team) or game data of the second player and the opponent game data group. Here, the game data represents data indicating one (discrete piece) that fights against the opponent in a competitive game, such as a character, a machine, or a card. The game data group represents data indicating a set (group) of a plurality of game data, such as a team, a corps, or a card deck.

The game execution unit 102 causes the game character 54 belonging to each team to act in accordance with the player's operation or the computer's operation, and updates the game situation data, to thereby execute the first match and the second match. The data indicating the match result (winning or losing) of the match executed by the game execution unit 102 may be accumulated in the game data storage unit 100.

3-3. Character String Group Presentation Unit

The character string group presentation unit 104 is implemented mainly by the control unit 2. The character string group presentation unit 104 presents the first character string group and the second character string group to the first player. Here, the character string group presentation unit 104 presents the first character string group and the second character string group to the first player by displaying the first character string group and the second character string group stored in the candidate character string data on display means corresponding to the first player (for example, display unit 32 of the game device 10 operated by the first player) during the first match or after the match.

3-4. Input Information Acquisition Unit

The input information acquisition unit 106 is implemented mainly by the control unit 9. The input information acquisition unit 106 acquires the input information (character string data) input by the first player during execution of the first match or after the execution thereof in regard to the game data selected as an input target from among the game data (for example, game characters 54) belonging to the opponent game data group (for example, third team).

The input information is information relating to an action of the game character 54 belonging to the third team, for example, information indicating a feature (for example, merit or demerit of the game character 54) of the game character 54. The input information acquisition unit 106 acquires the input information input by the first player through the input screen 70. The input target represents the game, character 54 on which the first player is to leave the input information among the game characters 54 belonging to the third team.

Here, after the first match is executed, the input information acquisition unit 106 receives the first player's selection of the opponent game data as the input target from among opponent game data (for example, game characters 54) belonging to the opponent game data group (for example, third team). For example, the first player's selection is received from among the game characters 54 belonging to the third team which are displayed on the character selection screen 60. The input information on the selected game character 54 is input.

The input information acquisition unit 106 includes means for acquiring a character string selected by the first player from within the first character string group at the first character string, means for acquiring a character string selected by the first player from within the second character string group as the second character string, and means for acquiring the input information based on the first character string and the second character string that are acquired as described above. In other words, the input information acquisition unit 106 generates and acquires the input information obtained by coupling the first character string and the second character string that have been selected by the first player.

Note that, the description is made here by taking an example in which the input target is designated by the first player, but the input target may be selected by the computer. For example, the input target may be selected based on the match result of the first match (for example, the game character 54 that has scored may be selected) from among the game characters 54 belonging to the third team.

3-5. Input Information Recording Unit

The input information recording unit 108 is implemented mainly by the control unit 2. The input information recording unit 108 records the input information acquired by the input information acquisition unit 106 in storage means (for example, game data storage unit 100) in association with the game data on the input target. Here, the input information recording unit 108 stores the input information including at least the first character string and the second character string in the input data, to thereby record the input information in the game data storage unit 100.

3-6. Input Information Presentation Unit

The input information presentation unit 110 is implemented mainly by the control unit 2. In a case where the second match is executed, the input information presentation unit 110 presents the second player with the input information relating to the input target, which is input by the first player. The wording "the case where the second match it executed" refers to "before execution of the second match or during the execution thereof".

The input information presentation unit 110 displays the input information input by the first player on the input information display screen 90, to thereby present the input information input by the first player to the second player. In addition, the input information presentation unit 110 may present the input information input by the first player to the second player by outputting the voice indicating the input information input by the first player.

4. Processing Executed in the Game System

Next, a description is made of processing executed in the game system S. Here, the description of the processing executed in the game system S is directed to input information accumulation processing for accumulating the input information input by the first player in the server device 1 after the first match and input information presentation processing for displaying the input information input by the first player before the second match. The input information accumulation processing and the input information presentation processing that are described below are performed by the control unit 2 executing the program stored in the server device 1 and by the control unit 14 executing the program stored in the storage unit 16 or the optical disc 36.

4-1. Input Information Accumulation Processing

FIG. 13 is a figure showing an example of the input information accumulation processing. The input information accumulation processing is executed during the first match or after the match.

As showed in FIG. 13, first, the control unit 2 of the server device 1 refers to the player data to generate display data of the character selection screen 60 including a list of the game characters 54 belonging to the third team, and transmits the display data to the game device 10 through the communication interface 5 (S101). In S101, a record corresponding to the third player is read from the player data, and the game character 54 belonging to the third team is identified. The display data including the information indicating the identified game character 54 is generated.

On the game device 10, when receiving the display data from the server device 1, the control unit 14 displays the character selection screen 60 on the display unit 32 (S102). The control unit 14 determines whether or not the game character 54 belonging to the third team has been selected based on a signal received from the controller 30 (S103). In S103, the first player's selection of the game character 54 (input target) on which the first player is to leave the input information is received.

When it is determined that the game character 54 belonging to the third team has been selected (S103; Y), the control unit 14 transmits information (for example, information indicating the name of the game character 54 or ID for uniquely identifying the game character 54) for identifying the selected game character 54 and a display request for the input screen 70 to the server device 1 (S104).

On the server device 1, when receiving the information for identifying the game character 54 selected by the first player and the display request for the input screen 70, the control unit 2 generates the display data for the input screen 70, and transmits the display data to the game device 10 through the communication interface 5 along with candidate character string group data (S105). The input screen 70 includes the game character name 72 indicating the game character 54 selected by the first player.

On the game device 10, when receiving the display data of the input screen 70 and the candidate character string group data, the control unit 14 displays the input screen 70 on the display unit 32 (S106). The control unit 14 determines whether or not the first character string selection image 74 or the second character string selection image 76 has been selected based on a signal received from the controller 30 (S107).

When it is determined that the first character string selection image 74 or the second character string selection image 76 has been selected (S107; Y), based on the candidate character string group data, the control unit 14 displays the first character string group in the first character string selection image 7A as a candidate for the first character string and displays the second character string group in the second character string selection image 66 as a candidate for the second character string (S108). When the first character string and the second character string are selected by the first player, the information indicating the first character string and the second character string that have been selected is temporarily stored in the main memory 16.

The control unit 14 determines whether or not the enter button 78 has been selected (S109). When it is determined that the enter button 78 has been selected (S109; Y), the control unit 14 transmits the first character string and the second character string that have been selected by the first player to the server device 1 through the communication interface 28 (S110).

On the server device 1, the control unit 2 acquires the input information by coupling the first character string and the second character string that have been received from the game device 10, and stores the input information into the input data (S111). In S111, the above-mentioned input information is stored into the record corresponding to the game character 54 transmitted in S104 among the records corresponding to the third player within the input data.

On the other hand, on the game device 10, the control unit 14 determines whether or not a given termination operation has been performed based on a signal received from the controller 30 (S112). When it is determined that the termination operation has been performed (S112; Y), the processing is brought to an end. When it is not determined that the termination operation has been performed (S112; N), the processing returns to S102, in which the input screen 70 is displayed on the display unit 32, and the input information on another game character 54 is input.

4-2. Input Information Presentation Processing

FIG. 14 is a figure showing an example of the input information presentation processing. Here, the input information presentation processing is executed before the second match.

As showed in FIG. 14, first, on the server device 1, the control unit 2 refers to the input data to identify the game character 54 on which the input information has been registered by the first player among the game characters 54 (starters and backup members) belonging to the third team (S201). In S201, it is determined whether or not the input information is stored in the record of each game character 54 among the records corresponding to the third player within the input data.

The control unit 2 refers to the player data to identify the formation of the third team, generates, the display data of the formation guide screen 80 obtained by locating a given mark 88 around the character on which the input information has been registered within the formation image 86, and transmits the display data to the game device 10 through the communication interface 5 (S202).

On the game device 10, when receiving the display data of the formation guide screen 80, the control unit 14 displays the display data on the display unit 32 (S203). The control unit 14 determines whether or not the mark 88 has been selected hated on a signal received from the controller 30 (S204). In S204 it is determined whether or not a display request operation for the input information relating to the game character 54 has been performed.

When it is determined that the mark 88 has been selected (S204; Y), the control unit 14 transmits the information for identifying the game character 54 corresponding to the mark 88 and a reference request for the input information relating to the game character 54 to the server device 1 (S205).

On the server device 1, the control unit 2 refers to the input data to acquire the input information registered in the game character 54 for which the reference request has been made, generates the display data of the input information display screen 90 including the input information list 94, and transmits the display data to the game device 10 (S206). Acquired in S206 is the input information stored in the record corresponding to the game character 54 selected by the second player among the records corresponding to the third team within the input data.

On the game device 10, when receiving the display data of the input information display screen 90, the control unit 2 displays the input information display screen 90 on the display unit 32 (S207).

The control unit 2 determines whether or not a given match starting operation has been performed (S208). When it is determined that the match starting operation has been performed (S208; Y), the processing is brought to an end, and the match against the third player is started. When it is not determined that the match starting operation has been performed (S208; N), the processing returns to S203, in which the display request for the input information relating to another game character 54 is waited for.

According to the game device 10 described above, the first player can leave the input information on merits, demerits, and the like of each game character 54 belonging to the third team during the match between the first team and the third team or after the match. In the case where the second team competes against the third team, the input information can be viewed by the second player, and hence the second player can be notified of a tendency of the third player that cannot be known from the formation and the like, which allows the second player to prepare a counterplan.

Further, according to the embodiment, in creating the input information, the first player selects the first character string and the second character string from among the character string groups provided in advance, and hence it is possible to prevent such contents as to offend the third player from being input compared to a case where the first player is free to input any text, which can maintain soundness of the game.

5. Modification Examples

Note that, the present invention is not limited to the embodiment described above, and can be modified suitably without departing from the spirit of the present invention.

(1) For example, when the level (skill) is too different between the first player who has left the input information and the second player, the input information provided by the first player may be uninformative for the second player. In such a case, the input information left by the first player may be inhibited from being displayed for the game device 10 of the second player. In other words, only a player having a similar strength to the player who has left the input information is informed of the input information.

Information relating to a strength of the first player and information relating to a strength of the second player are stored in the game data storage unit 100. Here, the player data stores information relating to a strength of each player, for example, a numerical value indicating the level (or experience point) of the player. The larger numerical value indicates the stronger player.

The game system S according to Modification Example (1) includes: comparison means for comparing the strength of the first player with the strength of the second player in the case where the second match is executed; and means for restricting a presentation of the input information input by the first player to the second player hated on a comparison result from the comparison means. Those respective means are implemented by, for example, the game execution unit 102. The wording "restricting a presentation of the input information to the second player" means to inhibit the input information from being displayed so that the input information left by the first player is not displayed on the game device 10 of the second player.

Here, it is determined whether or not a difference between the strength of the first player and the strength of the second player is within a predetermined range. For example, it is determined whether or not the numerical value indicating the strength of the first player and the numerical value indicating the strength of the second player is within the predetermined range. When the difference is equal to or larger than a reference value, it is determined that there is a large difference between the strength of the first player and the strength of the second player.

When it is determined that the difference between the strength of the first player and the strength of the second player it within the predetermined range (equal to or larger than the reference value), the limitation is imposed on the input information provided by the first player to be presented to the second player. In other words, when it is determined that there is a large difference between the strength of the first player and the strength of the second player, the limitation is imposed on the input information provided by the first player to be presented to the second player.

According to Modification Example (1), when the difference between the strength of the first player and the strength of the second player is too large, the input information provided by the first player may be uninformative for the second player, and hence it is possible to impose the limitation on the presentation of the input information.

Note that, in Modification Example (1), it is conceivable that the strength of the first player may change after the first player leaves the input information, and hence information indicating the strength of the first player at a time point (in other words, time of the first match) at which the first player leaves the input information may be stored to perform a comparison between the information and the strength of the second player at a current time point.

(2) Further, for example, when there it too large a difference between an ability of the game character 54 belonging to the first team and an ability of the game character 54 belonging to the second team, the input information left by the first player may be uninformative for the second player. In such a case, the input information provided by the first player may be inhibited from being presented to the second player.

A first game parameter relating to the game data group (for example, first team) or the game data of the first player and a second game parameter relating to the game data group (for example, second team) or the game data of the second player are stored in the game data storage unit 100. The game parameter is a parameter indicating, for example, the ability or the status (for example, stamina or condition) of a team or the game character 54 belonging to the team, and is stored in the player data here.

The game system S according to Modification Example (2) includes: comparison means for comparing the first game parameter with the second game parameter in the case where the second match is executed; and means for restricting a presentation of the input information input by the first player to the second player based on a comparison result from the comparison means. Those respective means are implemented by, for example, the game execution unit 102.

Here, it is determined whether or not the first game parameter and the second the game parameter has a predetermined relationship. The predetermined relationship represents a relationship in which a difference between the value of the first game parameter and the value of the second the game parameter is within the predetermined range (equal to or larger than the reference value), and it is determined, for example, whether or not the difference in the ability value between the first team or the game character 54 belonging to the first team and the second team or the game character 54 belonging to the second team is equal to or larger than the reference value or whether or not the difference in the status between the first team or the game character 54 belonging to the first team and the second team or the game character 54 belonging to the second team is equal to or larger than the reference value.

When it is determined that the difference between the value of the first game parameter and the value of the second game parameter is within the predetermined range, (equal to or larger than the reference value), the limitation is imposed on the input information provided by the first player to be presented to the second player.

According to Modification Example (2), for example, when the difference between the ability of the first team and the ability of the second team is too large, the input information provided by the first player may be uninformative for the second player, and hence it is possible to impose the limitation on the presentation of the input information.

Note that, in Modification Example (2), it is conceivable that the ability of the first team and the like may change after the first player leaves the input information, and hence the valve of the first game parameter at a time point (in other words, time of the first match) at which the first player leaves the input information may be stored to perform a comparison between the information and the value of the second game parameter at a current time point.

(3) Further, for example, the second player may be allowed to view the input information left by the first player only when a kind of the first team corresponds to a kind of the second team. For example, in a case where a game that imitates an actual soccer league is executed, when a predetermined soccer team belonging to the soccer league is used by the first player and the second player in the game, the input information provided by the first player may be presented to the second player.

The game system S according to Modification Example (3) includes: means for setting the game data group or the game data selected by the first player from among a plurality of kinds of game data group (for example, soccer team belonging to the actual soccer league) or game data provided to the game as the game data group or the game data of the first player; and means for setting the game data group or the game data selected by the second player from among the plurality of kinds of game data group or game data as the game data group or the game data of the second player. The means are implemented by the game execution unit 102.

The wording "the team of the player" used here includes the team used by the first player in the game and the team associated with the first player. The team used by the first player in the game is a team included in the team information on the player data, and the team associated with the first player is a team included in the player information on the player data. The data indicating the kind of the team used in the game is stored in the game data storage unit 100 in advance, and the team of the player is set by being selected by each player.

Further, the game system S includes comparison means for comparing a kind of the game data group or a kind of the game data of the first player with a kind of the game data group or a kind of the game data of the second player in the case where the second match is executed; and means for restricting a presentation of the input information input by the first player to the second player based on a comparison result from the comparison means. Those respective means are implemented by, for example, the game execution unit 102.

For example, it is determined whether or not the team of the first player and the team of the second player are of a corresponding kind. The corresponding kind means that the team of the first player and the team of the second player are of the same kind or belong to the same league. The league represents a group to which a plurality of kinds of team belong, and it is assumed that the information indicating the teams belonging to the same league is stored in the game data storage unit 100 in advance.

When the team of the first player and the team of the second player are not of the corresponding kind, the limitation is imposed on the input information provided by the first player to be presented to the second player.

According to Modification Example (3), for example, the players using teams corresponding to each other can have a feeling that the players cooperate with each other to defeat a common enemy, which can improve entertaining characteristics of the game.

(4) Further, for example, the input information provided by the first player may be presented to the second player when the attribute of the first player and the attribute of the second player relate to each other. For example, the input information provided by the first player may be presented to the second player when the residence of the first player and the residence of the second player are the same.

The game data storage unit 100 stores the attribute information on the first player and the attribute information on the second player. Here, the attribute information on the first player and the attribute information on the second player are stored in the player data.

The game system S according to Modification Example (4) includes comparison means for comparing the attribute information on the first player with the attribute information on the second player in the case where the second match is executed; and means for restricting a presentation of the input information input by the first player to the second player based on a comparison result from the comparison means. Those respective means are implemented by, for example, the game execution unit 102.

For example, it is determined whether or not the attribute of the first player and the attribute of the second player correspond to each other. The wording "the attribute of the first player and the attribute of the second player correspond to each other" represents a relationship in which two players have personal information (registration information) similar to each other, for example, a relationship in which the information (for example, residence, age, sex, relationship, and occupation) relating to the two players themselves or the information (for example, favorite soccer team) relating to the taste of the two players is similar therebetween.

More specifically, the attribute of the first player and the attribute of the second player correspond to each other when a combination of the residence of the first player and the residence of the second player is a given combination (for example, the same region), when the age of the first player and the age of the second player are both within a predetermined range, the sex of the first player and the sex of the second player are the same or different from each other, when a combination of the relationship of the first player and the relationship of the second player is a given combination (for example, the same family structure), when a combination of the occupation of the first player and the occupation of the second player is a given combination (for example, the same occupation), and when a combination of the favorite team of the first player and the favorite team of the second player is a given combination (for example, the same).

When the attribute of the first player and the attribute of the second player do not correspond to each other, the limitation is imposed on the input information provided by the first player to be presented to the second player.

According to Modification Example (4), for example, the players in the same residence can have a feeling that the players cooperate with each other to defeat the common enemy, which can improve the entertaining characteristics of the game.

(5) Further, for example, when there is a difference in the tactics between the first player and the second player, the input information provided by the first player may be uninformative for the second player, and hence in such a case, the input information may be inhibited from being displayed on the game device 10 of the second player. In other words, only the player who uses the same tactic as the player who has left the input information is informed of the input information.

The game system S according to Modification Example (5) includes: means for setting the tactic selected from among a plurality of kinds of tactics provided to the game as the tactic of the game data group (for example, first team) or the game data of the first player; and means for setting the tactic selected from among the plurality of kinds of tactics as the tactic of the game data group (for example, second team) or the game data of the second player. The means are implemented by, for example, the game execution unit 102. For example, the tactic selected by each player or the tactic determined by the computer based on a given determination algorithm before the match is set as the tactic of the player. Here, the tactic of each player is stored in the player data.

Further, the game system S includes comparison means for comparing the tactic of the first player with the tactic of the second player in the case where the second match is executed; and means for restricting a presentation of the input information input by the first player to the second player based on a comparison result from the comparison means. Those respective means are implemented by, for example, the game execution unit 102.

For example, it is determined whether or not the tactic of the first player and the tactic of the second player correspond to each other. The wording "the tactic of the first player and the tactic of the second player correspond to each other" represents a relationship in which the tactic of the first player and the tactic of the second player are the same or a relationship in which combination of the tactics is designated by the game creator. It is assumed that data indicating the combination of tactics designated by the game creator is stored in the game data storage unit 100.

When the tactic of the first player and the tactic of the second player do not correspond to each other, the limitation is imposed on the input information provided by the first player to be presented to the second player.

According to Modification Example (5), for example, when the tactic of the first team is different from the tactic of the second team, the input information provided by the first player may be uninformative for the second player, and hence it is possible to impose the limitation on the presentation of the input information.

Note that, in Modification Example (5), it is conceivable that the tactic of the first team may change after the first player leaves the input information, and hence the tactic of the first team at the time point (in other words, time of the first match) at which the first player leaves the input information may be stored to perform a comparison between this tactic and the tactic of the second team at the current time point.

(6) Further, for example, there may be a difference in the tactics of the third player depending on which of the first player and the second player is the opponent. In such a case, the input information left by the first player may be uninformative for the second player, and hence the input information may be inhibited from being displayed on the game device 10 of the second player. In other words, when the third player uses the similar tactics between the time of the first match and the time of the second match time, the input information provided by the first player is presented to the second player.

The game system S according to Modification Example (6) includes means for setting the tactic selected from among a plurality of kinds of tactics provided to the game as the tactic of the opponent group. The means is implemented by, for example, the game execution unit 102. For example, the tactic selected by the player of the opponent or the tactic determined by the computer based on a given determination algorithm before the match are set.

Further, the game system S includes: comparison means for comparing the tactic set for the opponent game data group (for example, third team) at the time of the first match with the tactic currently set for the opponent game data group in the case where the second match is executed; and means for restricting a presentation of the input information input by the first player to the second player based on a comparison result from the comparison means. Those respective means are implemented by, for example, the game execution unit 102.

For example, it is determined whether or not the tactic at the time of the first match and the tactic at the time of the second match correspond to each other. The wording "the tactic at the time of the first match and the tactic at the time of the second match correspond to each other" represents a relationship in which the tactic at the time of the first match and the tactic at the time of the second match are the same or a relationship in which a combination thereof is designated by the game creator in advance. It is assumed that data indicating the above-mentioned combination designated by the game creator is stored in the game data storage unit 100.

When the tactic at the time of the first match and the tactic at the time of the second match do not correspond to each other, the limitation is imposed on the input information provided by the first player to be presented to the second player.

According to Modification Example (5), for example, when the tactic of the third team at the time of the first match is different from the tactic of the third team at the time of the second match, the input information provided by the first player may be uninformative for the second player, and hence it is possible to impose the limitation on the presentation of the input information.

(7) Further, for example, when the position of the game character 54 on which the first player has left the input information changes at the time of the second match, the input information may be uninformative, and hence in such a case, the input information left by the first player may be inhibited from being presented to the second player.

The game system S according to Modification Example (7) includes means for setting the role selected from among a plurality of kinds of roles provided to the game for each game data belonging to the opponent game data group. The means is implemented by, for example, the game execution unit 102. For example, the role selected by the player of the opponent or the role determined by the computer based on a given determination algorithm before the match is set. Here, it is assumed that the role set for the game character 54 is stored in the player data, and when the match is finished, a history of the role set for the game character 54 at the time of the match is left.

Further, the game system S includes: comparison means for comparing the role set for the game data on the input target at the time of the first match with the role currently set for the game data in the case where the second match is executed; and means for restricting a presentation of the input information input by the first player to the second player based on a comparison result from the comparison means. Those respective means are implemented by, for example, the game execution unit 102.

For example, it is determined whether or not the role at the time of the first match and the role at the time of the second match correspond to each other. The wording "the role at the time of the first match and the role at the time of the second match correspond to each other" represents a relationship in which the role at the time of the first match and the role at the time of the second match are the same or a relationship in which a combination thereof is designated by the game creator in advance. It is assumed that data indicating the combination designated by the game creator in advance is stored in the game data storage unit 100.

When the role at the time of the first match and the role, at the time of the match do not correspond to each other, the limitation is imposed on the input information provided by the first player to be presented to the second player.

According to Modification Example (7), for example, when the role of the input target at the time of the first match is different from the role of the input target at the time of the second match, the input information provided by the first player may be uninformative for the second player, and hence it is possible to impose the limitation on the presentation of the input information.

(8) Further, for example, when there is too large a difference between the ability of the game characters 54 belonging to the third team who has left the input information between the time when the first player leaves the input information and the time of the second match, the input information may be uninformative, and hence in such a case, the input information left by the first player may be inhibited from being presented to the second player.

The game parameter relating to the opponent game data group (for example, third team) or each game data belonging to the opponent game data group is stored in the game data storage unit 100. Here, it is assumed that the game parameter relating to the third team is stored in the player data, and when the match is finished, information indicating a history of the game parameter at the time of the match is stored.

The game system S according to Modification Example (8) includes: comparison means for comparing the game parameter at the time of the first match with the current game parameter in the case where the second match is executed; and means for restricting a presentation of the input information input by the first player to the second player based on a comparison result from the comparison means. Those respective means are implemented by, for example, the game execution unit 102.

Here, it is determined whether or not the game parameter at the time of the first match and the game parameter at the time of the second match have a predetermined relationship. The predetermined relationship represents a relationship in which a difference between the value of the game parameter at the time of the first match and the value of the game parameter at the time of the second match is within the predetermined range (equal to or larger than the reference value), and it is determined, for example, whether or not the difference in the ability value of the game character 54 between the time of the first match and the time of the second match is equal to or larger than the reference value or whether or not the difference in the status of the game character 54 between the time of the first match and the time of the second match is equal to or larger than the reference value.

When the game parameter at the time of the first match and the game parameter at the time of the second match have the predetermined relationship, the limitation is imposed on the input information provided by the first player to be presented to the second player.

According to Modification Example (8), for example, when the difference in the ability of the input target between the time of the first match and the time of the second match, the input information provided by the first player may be uninformative for the second player, and hence it is possible to impose the limitation on the presentation of the input information.

(9) Further, for example, the descriptions of the embodiment and the modification examples are directed to the case where the first player leaves the input information and the second player can view the input information, but the third player may leave the input information on the first team after the first match. The input information can be viewed when another player competes against the first player. In the same manner, at the time of the second match, the third player can view the input information on the game character 54 belonging to the second team that has been left by another player.

(10) Further, for example, the description of the embodiment is directed to the case where the input information is generated from the first character string and the second character string, but as the input information, each player may be allowed to freely input a character string, a symbol string, an image, or voice. In this case, as the image or the voice to be input as the input information, the image or the voice stored in advance may be used, the image data may be generated based on a user's drawing operation, or the audio data may be generated based on the voice input through a microphone or the like by the user.

(11) Further, for example, the present invention can be applied to a game system for executing a game (for example, baseball game) other than the soccer game. In addition, the present invention can be applied to, for example, a game device for executing a game or the like configured so that the player uses a plurality of cards to play a match. In other words, the description of the embodiment is directed to the case where the game data group is a game character data group and the game data is game character data, but the game data group may be a game card data group and the game data may be game card data.

(12) Further, for example, the description of the embodiment is directed to the case where the server device 1 executes the game by acquiring the information indicating the player's operation from the game device 10, but any one of the game devices 10 may play the role of the server. In this case, the game device 10 playing the role of the server executes various kinds of processing by acquiring the information indicating the contents of the player's operation from another game device 10. In this case, the game data storage unit 100, the game execution unit 102, the character string group presentation unit 104, the input information acquisition unit 106, the input information recording unit 108, and the input information presentation unit 110 are implemented by the game device 10 playing the role of the server.

Further, the game device 10 of each player may store the input information input by the player who operates the game device 10 or the input information relating to the team of the player who operates the game device 10. In this case, the input information acquisition unit 106 and the input information recording unit 108 are implemented by each game device 10, and the input data is stored in each game device 10.

(13) Further, for example, the description of the embodiment is directed to the case where the game system is implemented by a plurality of game devices, but it suffices that the game system is implemented by one or a plurality of computers, and the device forming the game system is not limited to the example of the embodiment. For example, the game system may be implemented by one game device. In this case, there exist display units and controllers the numbers of which are the same as the number of players. The control unit of the game device acquires an operation state of each controller to update the game situation data. Then, the control unit may generate the game screen to be displayed on the display unit of each player, and may display the game screen on each display unit. In this case, the respective functional blocks of the game system are implemented mainly by the control unit and the storage unit of the above-mentioned one game device.

(14) Further, for example, the description of the embodiment is directed to the case where three players play the game, but the number of players may be equal to or larger than three.

The invention claimed is:
1. A game system comprising:
a first game terminal which a first player operates;
a second game terminal which a second player operates;
an opponent game terminal which an opponent operates; and
a game server;
wherein the first game terminal, the second game terminal, the opponent game terminal and the game server are connectable to an internet;
wherein at least one of the first game terminal, the opponent game terminal, and the game server is configured to:
  execute a first match based on at least one first game object which the first player uses and a plurality of opponent game objects which the opponent uses and are not the opponent itself;
  identify at least one opponent game object which is selected by the first player from among the plurality of opponent game objects as at least one selected game object;
  acquire input information that is input by the first player during or after the first match in regard to the at least one selected game object; and
  record, in an online storage in the internet, the input information in association with the at least one selected game object;
wherein at least one of the second game terminal, the opponent game terminal, and the game server is configured to:
  execute a second match based on at least one second game object which the second player uses and the plurality of opponent game objects;
  acquire information relating to a strength of the first player from a storage that stores the information relating to the strength of the first player;
  acquire information relating to a strength of the second player from a storage that stores the information relating to the strength of the second player;
  compare the strength of the first player with the strength of the second player if the second match is executed;

restrict a presentation of the input information input by the first player to the second player based on a comparison result; and present to the second player, the input information which matches a second player's request if the second match is executed.

2. The game system according to claim 1, the at least one of the second game terminal, the opponent game terminal, and the game server further:

acquires at least one first game parameter respectively relating to the at least one first game object from a storage that stores the at least one first game parameter;

acquires at least one second game parameter respectively relating to the at least one second game object from a storage that stores the at least one second game parameter;

compares the at least one first game parameter with the at least one second game parameter if the second match is executed; and restricts a presentation of the input information input by the first player to the second player based on a comparison result.

3. The game system according to claim 1, the at least one of the second game terminal, the opponent game terminal, and the game server further:

compares a kind of the at least one first game object with a kind of the at least one second game object if the second match is executed; and restricts a presentation of the input information input by the first player to the second player based on a comparison result.

4. The game system according to claim 1, the at least one of the second game terminal, the opponent game terminal, and the game server further:

acquires attribute information on the first player from a storage that stores the attribute information on the first player;

acquires attribute information on the second player from a storage that stores the attribute information on the second player;

compares the attribute information on the first player with the attribute information on the second player if the second match is executed; and restricts a presentation of the input information input by the first player to the second player based on a comparison result.

5. The game system according to claim 1, the at least one of the first game terminal, the opponent game terminal, and the game server further:

sets a tactic selected from among a plurality of kinds of tactics provided to a game as a tactic of the first player; and the at least one of the second game terminal, the opponent game terminal, and the game server:

sets a tactic selected from among the plurality of kinds of tactics as a tactic of the second player;

compares the tactic of the first player with the tactic of the second player if the second match is executed; and restricts a presentation of the input information input by the first player to the second player based on a comparison result.

6. The game system according to claim 1, the at least one of the second game terminal, the opponent game terminal, and the game server further:

sets a tactic selected from among a plurality of kinds of tactics provided to a game as a tactic of the plurality of opponent game objects;

compares the tactic set for the plurality of opponent game objects at a time of the first match with the tactic currently set for the plurality of opponent game objects if the second match is executed; and restricts a presentation of the input information input by the first player to the second player based on a comparison result.

7. The game system according to claim 1, the at least one of the second game terminal, the opponent game terminal, and the game server further:

sets a role selected from among a plurality of kinds of roles provided to a game for each of the plurality of opponent game objects;

compares the role set for the at least one selected game object at a time of the first match with the role currently set for the at least one selected game object if the second match is executed; and restricts a presentation of the input information input by the first player to the second player based on a comparison result.

8. The game system according to claim 1, the at least one of the second game terminal, the opponent game terminal, and the game server further:

acquires a game parameter relating to all or each of the plurality of opponent game objects from a storage that stores the game parameter;

compares the game parameter at a time of the first match with the current game parameter if the second match is executed; and restricts a presentation of the input information input by the first player to the second player based on a comparison result.

9. The game system according to claim 1, the at least one of the first game terminal, the opponent game terminal, and the game server further:

receives the first player's selection of the at least one selected game object after the first match is executed.

10. The game system according to claim 1, the at least one of the first game terminal, the opponent game terminal, and the game server further:

acquires information relating to a first character string group for providing candidates for a first character string and a second character string group for providing candidates for a second character string from a storage that stores the information;

presents the first player with the first character string group and the second character string group;

acquires a character string selected by the first player from within the first character string group as the first character string;

acquires a character string selected by the first player from within the second character string group as the second character string; and acquires the input information based on the first character string and the second character string that have been acquired.

11. The game system according to claim 1, the at least one first game object, the plurality of opponent game objects, and the at least one second game object are respectively a game character.

12. The game system according to claim 1, the at least one first game object, the plurality of opponent game objects, and the at least one second game object are respectively a game card.

13. A server device comprising at least one processor configured to:

execute a first match based on at least one first game object which a first player uses and a plurality of opponent game objects which an opponent uses and are not the opponent itself;

execute a second match based on at least one second game object which a second player uses and the plurality of opponent game objects;

identify at least one opponent game object which is selected by the first player from among the plurality of opponent game objects as at least one selected game object;

acquire input information that is input by the first player during or after the first match in regard to the at least one selected game object;

record, in an online storage in an internet, the input information in association with the at least one selected game object;

acquire information relating to a strength of the first player from a storage that stores the information relating to the strength of the first player;

acquire information relating to a strength of the second player from a storage that stores the information relating to the strength of the second player;

compare the strength of the first player with the strength of the second player if the second match is executed;

restrict a presentation of the input information input by the first player to the second player based on a comparison result; and present to the second player, the input information which matches a second player's request if the second match is executed.

14. A control method for a server device comprising:

executing a first match based on at least one first game object which a first player uses and a plurality of opponent game objects which an opponent uses and are not the opponent itself;

executing a second match based on at least one second game object which a second player uses and the plurality of opponent game objects;

identifying at least one opponent game object which is selected by the first player from among the plurality of opponent game objects as at least one selected game object;

acquiring input information that is input by the first player during or after the first match in regard to the at least one selected game object;

recording, in an online storage in an internet, the input information in association with the at least one selected game object;

acquiring information relating to a strength of the first player from a storage that stores the information relating to the strength of the first player;

acquiring information relating to a strength of the second player from a storage that stores the information relating to the strength of the second player;

comparing the strength of the first player with the strength of the second player if the second match is execute;

restricting a presentation of the input information input by the first player to the second player based on a comparison result; and presenting, to a second player, the input information which matches a second player's request if the second match is executed.

15. A non-transitory computer-readable information recording medium having a program configured to cause a computer to function of:

executing a first match based on at least one first game object which a first player uses and a plurality of opponent game objects which an opponent uses and are not the opponent itself;

executing a second match based on at least one second game object which a second player uses and the plurality of opponent game objects;

identifying at least one opponent game object which is selected by the first player from among the plurality of opponent game objects as at least one selected game object;

acquiring input information that is input by the first player during or after the first match in regard to the at least one selected game object;

recording, in an online storage in an internet, the input information in association with the at least one selected game object;

acquiring information relating to a strength of the first player from a storage that stores the information relating to the strength of the first player;

acquiring information relating to a strength of the second player from a storage that stores the information relating to the strength of the second player;

comparing the strength of the first player with the strength of the second player if the second match is executed;

restricting a presentation of the input information input by the first player to the second player based on a comparison result; and presenting, to the second player, the input information which matches a second player's request if the second match is executed.

* * * * *